(12) United States Patent
Nelson et al.

(10) Patent No.: US 6,413,579 B1
(45) Date of Patent: Jul. 2, 2002

(54) TEMPERATURE CONTROL OF CVD METHOD FOR REDUCED HAZE

(75) Inventors: Douglas Nelson, Curtis, OH (US); Steven Phillips, Ottawa, IL (US)

(73) Assignee: Libbey-Owens-Ford Co., Toledo, OH (US)

( * ) Notice: Subject to any disclaimer, the term of this patent is extended or adjusted under 35 U.S.C. 154(b) by 0 days.

(21) Appl. No.: 09/492,593

(22) Filed: Jan. 27, 2000

(51) Int. Cl.$^7$ .............................................. C23C 16/46
(52) U.S. Cl. ............. 427/166; 427/255.13; 427/255.15; 427/255.17; 65/60.2; 65/60.5; 65/60.51; 65/60.8
(58) Field of Search ........................... 427/166, 235.13, 427/255.15; 65/60.2, 60.5, 60.51, 60.8

(56) References Cited

U.S. PATENT DOCUMENTS

| | | |
|---|---|---|
| 2,617,741 A | 11/1952 | Lytle |
| 3,880,633 A | 4/1975 | Jordan et al. |
| 4,121,014 A | 10/1978 | Shaffer |
| 4,187,336 A | 2/1980 | Gordon |
| 4,206,252 A | 6/1980 | Gordon |
| 4,419,386 A | 12/1983 | Gordon |
| 4,743,506 A * | 5/1988 | Russo et al. |
| 4,803,127 A | 2/1989 | Hakim |
| 4,857,361 A | 8/1989 | Bloss et al. |
| 5,356,718 A | 10/1994 | Athey et al. |
| 5,618,579 A | 4/1997 | Boire et al. |
| 5,698,262 A * | 12/1997 | Soubeyrand et al. |
| 5,709,726 A | 1/1998 | Terneu et al. |
| 5,744,215 A | 4/1998 | Neuman |
| 5,798,142 A | 8/1998 | Soubeyrand |
| 5,821,001 A | 10/1998 | Arbab et al. |

FOREIGN PATENT DOCUMENTS

| | | |
|---|---|---|
| EP | 0782975 A1 | 7/1997 |
| GB | 2252332 A | 8/1992 |
| WO | WO 00/55102 | 9/2000 |

OTHER PUBLICATIONS

James Kane and H.P. Schweizer, Chemical Vapor Deposition of Transparent, Electrically Conductive Tin Oxide Films Formed From Dibutyl Tin Diacetate, J. Electrochem. Soc.: Solid–State Science and Technology; Aug. 1975, pp. 1144–1149, vol. 122, No. 8, U.S.

John M. Blocher, Jr., Coating of Glass by Chemical Vapor Deposition, Thin Solid Films, Mar. 6, 1981, pp. 51–63, vol. 77, No. 112/3.

* cited by examiner

*Primary Examiner*—Timothy Meeks
(74) *Attorney, Agent, or Firm*—Marshall & Melhorn, LLC

(57) ABSTRACT

The invention is a method of making a coated glass substrate having a low haze. A soda-lime glass substrate having at least one surface upon which a coating may be deposited is provided. The glass substrate is heated and maintained at a temperature sufficient to volatilize salts that may be formed during the depositing of a first coating on the glass substrate. A first gaseous precursor mixture including a halogen containing precursor, a metal precursor, an oxidizing agent, and an inert to carrier gas is directed toward and along the surface to be coated and reacting the mixture at or near the surface of the glass substrate to form a first coating containing a metal oxide coating. The glass substrate is cooled to a temperature to reduce crystalline growth in a second coating to be applied over the first coating. A second gaseous precursor mixture including a second metal precursor, an oxidizing agent, and an inert carrier gas is directed toward and along the coated surface of the glass substrate and reacting the mixture at or near the coated surface to form a metal containing coating. The glass substrate is cooled to an ambient temperature. The invention also includes a coated glass substrate produced in accordance with the aforementioned method.

13 Claims, 2 Drawing Sheets

TEMPERATURE CONTROL OF CVD METHOD FOR REDUCED HAZE

BACKGROUND OF THE INVENTION

The invention is a method of making a coated glass substrate. More particularly, the invention is a method of making a coated glass substrate which exhibits low haze.

In producing a coated a glass substrate, it is desired to minimize the amount of haze the coated glass substrate exhibits. In the coating of glass, the crystalline structure of the particular coating contributes to the haze exhibited by the glass. The conventional wisdom is that the larger the crystalline structures contained in each coating applied to a glass substrate, the more haze the coated substrate will exhibit. Thus, previous efforts to minimize the amount of haze have been directed to controlling the rate of crystalline growth of the coating material.

It is known in CVD coating that crystalline growth may be manipulated by controlling the temperature at which a coating is applied. The common wisdom is that the lower the temperature at which the coating is applied, the smaller the size of the resulting crystals contained in the coating applied to the glass substrate. Thus, prior attempts to minimize the haze exhibited by a coated glass substrate have been directed at coating the glass at lower temperatures.

In the case of soda-lime glass, another factor contributing to the haze exhibited by a coated glass substrate is the diffusion of sodium cations contained in the glass that form salts with halogens often associated with the precursors used to form the coatings. The sodium will typically diffuse to the surface of the glass and form a salt at the surface of the glass or in the initial coating layer. Past attempts to minimize the haze associated with the formation of such salts have required the use of precursor materials that do not contain a halogen. These non-halogen containing precursor materials are more expensive than the halogen containing counterparts. Also, the non-halogen containing precursor materials are not as stable as their halogen containing counterparts.

SUMMARY OF THE INVENTION

The invention is a method of making a coated glass substrate having a low haze. The invention relates to the discovery that formation of salts on the a surface of the coated glass substrate or an initial coating on the surface of the substrate contributes to the haze exhibited by the coated substrate. In practicing the invention, the relationship between haze exhibited by the coated glass substrate and the formation of salts must be appreciated in view of the relationship between the haze exhibited by the coated glass substrate and the crystalline growth of the coating material.

A soda-lime glass substrate having at least one surface upon which a coating may be deposited is provided. The glass substrate is heated and maintained at a temperature sufficient to volatilize any salts that may be formed during the depositing of a coating directly on the glass substrate. A gaseous precursor mixture including a halogen containing precursor, a metal precursor, an oxidizing agent, and an inert carrier gas is directed toward and along the surface to be coated and reacted at or near the surface of the glass substrate to form a first coating containing a metal oxide coating.

The glass substrate is then cooled to a temperature to reduce crystalline growth in a second coating to be applied over the first coating. A second gaseous precursor mixture including a second metal precursor, an oxidizing agent, and an inert carrier gas is directed toward and along the coated surface of the glass substrate and reacted at or near the coated surface to form a metal containing coating. Subsequently, the glass substrate is cooled to an ambient temperature. The invention also includes a coated glass substrate produced in accordance with the aforementioned method.

The invention may be used to produce a coated glass substrate with a low haze. The invention may be used to produce a coated glass substrate with a haze of less than 2%, preferably less than 1%. The invention may also be used to reduce the cost of producing a coated glass substrate. Through the use of the invention, less expensive halogen containing precursor materials may be used instead of the more costly non-halogen containing substitutes. The use of the halogen containing precursor materials is also beneficial because the halogen containing materials are more stable and easier to manipulate during manufacturing than their non-halogen containing counterparts.

BRIEF DESCRIPTION OF THE DRAWINGS

The above, as well as other advantages of the present invention, will become readily apparent to those skilled in the art from the following drawings and the detailed description of a preferred embodiment in which.

DETAILED DESCRIPTION OF PREFERRED EMBODIMENTS

It is to be understood that the specific devices and processes illustrated in the attached drawings and described in the following description are simply exemplary embodiments of the inventive concepts defined in the appended claims. Hence, specific dimensions and other physical characteristics relating to the embodiments disclosed herein should not be considered as limiting, unless the claims expressly state otherwise.

In the case of a coated glass substrate, there are two mechanisms in most film stacks which form haze. One mechanism relates to the crystal size of the constituents of the particular film or coating. That is, the larger the crystal size, the rougher the top surface of the film. Consequently, the rougher the top surface of the film, the more haze the coated glass substrate will exhibit. The crystal size may also be correlated to the thickness of the coating. Obviously, the thicker the coating, the greater the potential for larger crystalline structures that increase the haze exhibited by the glass substrate.

As previously stated, it is known in the art of CVD coating that temperature is an important factor in determining crystal size. The higher the temperature at which the coating is applied, the greater the crystal size. Thus, many past attempts to reduce haze have required applying CVD coatings to a glass substrate at temperatures which are as low as possible.

The second mechanism contributing to the haze exhibited by a coated glass substrate is the diffusion of sodium (hereinafter Na) to the surface of the glass substrate or to the initial coating applied to the glass substrate. The diffused Na is reactive and will form a salt with any precursor mixture which contains a halogen. The formed salt is typically disposed in the is initial coating applied to the surface of the glass substrate.

It has been found that to reduce the haze caused by the salt, the salt may be vaporized of the surface of the substrate at a high temperature. Vaporizing the formed salt may also be referred to as volatilizing the salt. The temperature required to vaporize the formed salt will depend on the vapor pressure of the salt and also the concentration of the formed salt. As the concentration of the formed salt increases, the amount of heat needed to vaporize the higher salt content will also increase.

Figure 1:
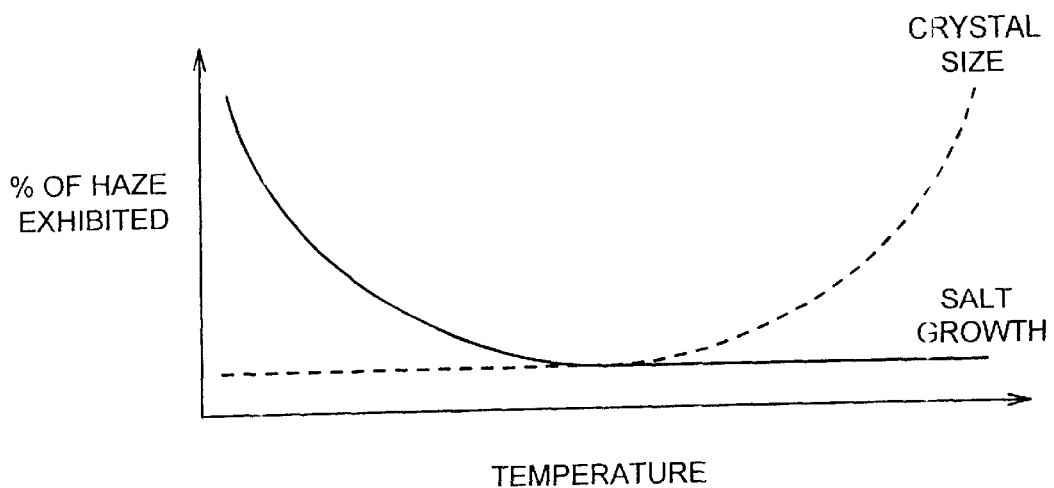
FIG. 1 is a chart of how haze is related to temperature for a first coat applied to a surface of a soda-lime glass substrate.

Thus, two of the primary mechanisms which form the haze exhibited by a coated glass substrate are temperature controlled. The mechanisms are in direct opposition to each other in their individual relationships to temperature, as shown in FIG. 1.

Figure 2:
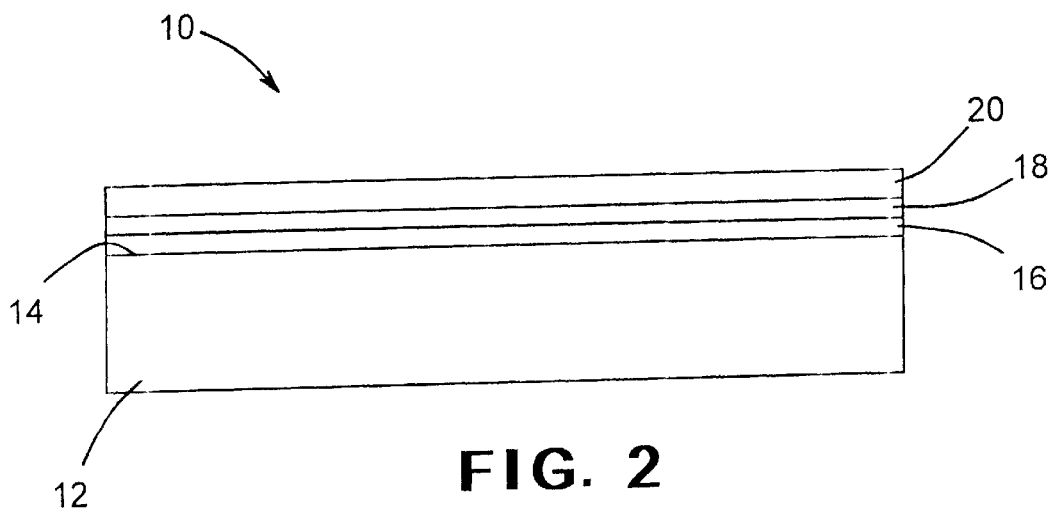
FIG. 2 is a side elevational view of a coated glass substrate coated in accordance with the invention.

Now referring to FIG. 2, a coated glass substrate 10 is shown. The coated glass substrate 10 includes a glass substrate 12 having at least one surface 14 to be coated. The glass substrate 10 is preferably a soda-lime glass substrate. The glass substrate 10 typically has a 4 mm nominal thickness. The surface 14 is coated with a first coating 16. The first coating 16 may also be referred to as a base coating or initial coating.

The first coating 16, in the preferred embodiment, is a metal-oxide coating, preferably tin-oxide. However, the invention is not limited to the use of a metal-oxide nor the use of tin. Other metals that may be substituted for the tin in the first coating 16 include at least titanium, silicon, zinc, and magnesium. Also this invention may be practiced to apply a metal-nitride coating, such as titanium-nitride to the glass substrate 12. In the preferred embodiment, the coating 16 may be about 200 to about 500 Å thick, preferably about 250 Å.

The thickness of the first coating 16 is an important factor. Due care should be taken during the deposition of the first coating 16 so that the thickness of the first coating 16 is within the specified range. Given the lack of depth (or relative thinness) of the first coating 16, the first coating 16 does not provide ample area for crystalline growth of the metal-oxide of the first coating 16 to significantly contribute toward the overall haze of the coated glass substrate 10. It is believed that if the first coating 16 was as thick as the top coating 20, to be subsequently described, crystalline growth of the metal-oxide in the first coating 16 would significantly contribute to the overall haze exhibited by the coated glass article 10.

An intermediate coating 18 may also be applied to the first coating 16. In the preferred embodiment, the intermediate coating 18 is a silica coating. The intermediate coating 18 is about 200 to 300 Å thick, preferably 250 Å. The intermediate coating 18 is not required to practice the invention.

The use of the intermediate coating 18 acts a color suppression layer by suppressing the inherent reflective color of the coated glass substrate 10. The intermediate coating 18 may also act as a Na diffusion barrier by prohibiting the diffusion of Na contained in the glass substrate 12 from diffusing into any subsequent layers applied after the first coating 16.

A metal containing top coating 20 is applied over the base, or optional intermediate coating 18. Preferably, the top coating 20 is a halogen doped metal oxide, such as fluorine doped tin-oxide. However, the invention is not limited to the use of fluorine doped tin-oxide as the top coating 20. Other suitable metallic coatings may be applied as the top coating 20. The top coating 20 is typically 2000 to 3500 Å thick.

Figure 3:
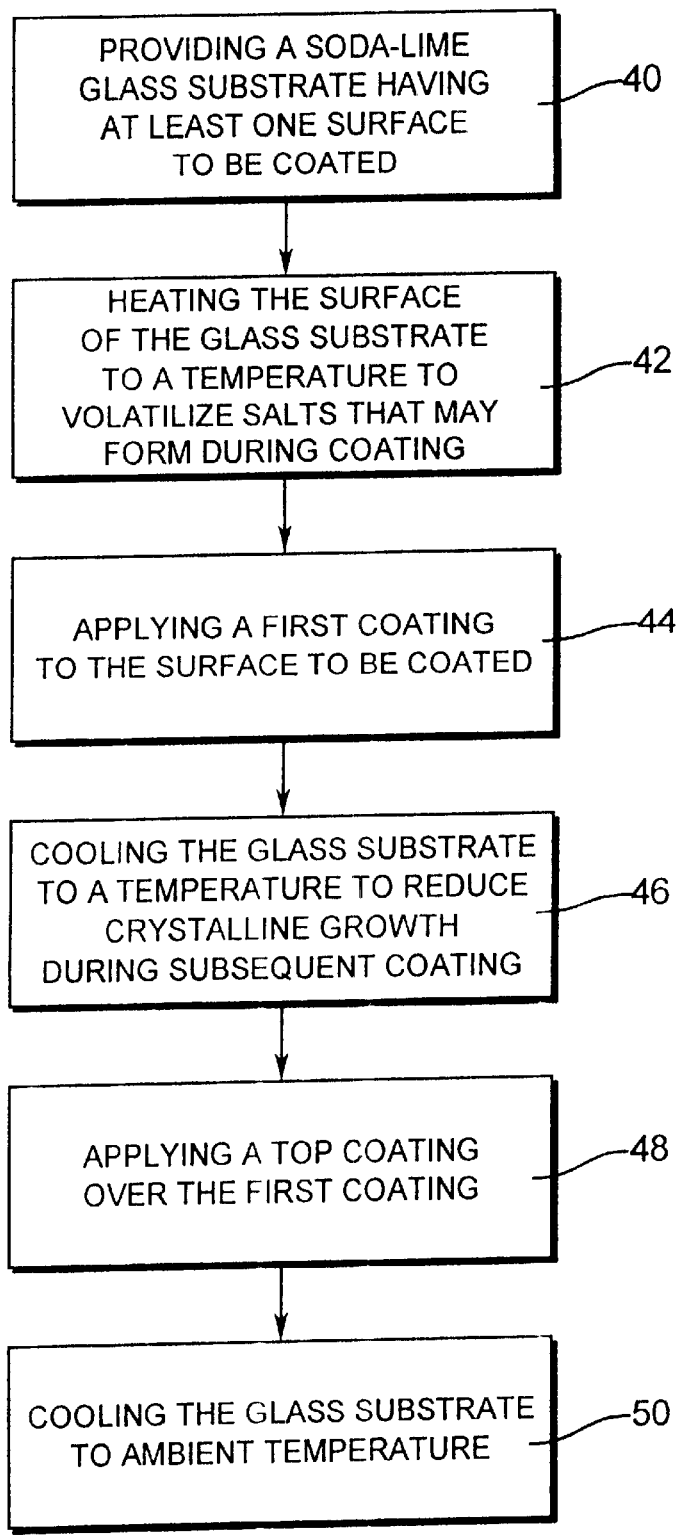
FIG. 3 is a flow chart of a preferred method of practicing the invention.

Referring to FIG. 3, the method of making the preferred embodiment of the coated glass substrate 10 shown in FIG. 2 includes providing a soda-lime glass substrate 12 with at least one surface 14 to be coated (Box 40).

The glass substrate 12 is heated to a temperature sufficient to volatilize any salts that may form during the application of the first coating 14 (Box 42). However, the glass substrate 12 should not healed above the iridescence temperature of the glass. For example, in the case of volatilizing sodium-chloride salt, the glass substrate 12 is heated to a temperature above 1260° F., preferably above 1280° F., but not above a temperature of 1370° F.

A first gaseous precursor mixture is directed toward and along the surface 14 of the glass substrate 12 to form the first coating 16 on the surface 14 (Box 44). The first gaseous mixture is reacted at or near the surface 14 to be coated. The first gaseous mixture includes at least a metal precursor, a halogen containing precursor, an oxidizing agent, and an inert carrier gas.

In the preferred embodiment, the first coating 16 is a metal-oxide, such as tin-oxide. The instant invention is not limited to the use of a tin-oxide coating. In this embodiment, the first gaseous mixture may include at least dimethyltin-dichloride (hereinafter DMT), oxygen, and helium. The temperature range for the application of the first coating is at least about 1260° F., preferably at least about 1280° F., up to about 1370° F.

The preferred embodiment also includes the application of an optional intermediate coating 18 over the first coating 16. In forming an intermediate coating 18 of silica, a gaseous precursor mixture including at least a silane material, oxygen ,and an inert carrier gas is directed toward and along the surface 14 of the glass substrate 12. This gaseous mixture is reacted at or near the surface 14 to be coated. In applying the intermediate coating 18, the temperature range for the application of the gaseous mixture may be the temperature of the glass substrate 12 after the application of the first coating 16 or lower. Nonexhaustive examples of suitable constituents for the gaseous mixture which is reacted to form the intermediate coating 18 include dichlorosilane (hereinafter DCS), oxygen, and helium. The invention is not limited to the above listed chemical constituents. U.S. Pat. No. 5,798, 142, issued to Soubeyrand, is incorporated herein by reference, as if fully rewritten, in regards to the application of an intermediate coating 18 of silica.

At least before the application of the top coating 20, the glass substrate is cooled to a temperature to reduce crystalline growth of the material of the top coating 20 (Box 46). Optionally, the glass substrate 12 may be cooled before the application of the intermediate coating 18. In the preferred embodiment, the glass substrate 12 is cooled to 1200° F. or less prior to application of the top coating 20. However, the glass substrate 12 preferably should not be cooled to less than 1090° F. The minimum temperature of 1090° F. is preferred for additional glass processing steps such as annealing in a Lehr.

Preferably, the top coating 20 is applied to the glass substrate 12 at a temperature between 1200° F. and 1090° F. For the application of the top coating 20, a second gaseous precursor mixture is directed toward and along the surface 14 of the glass substrate 12 (Box 48). The second gaseous mixture is reacted on or near the first coating 16 or the optional intermediate coating 18. The second gaseous precursor mixture contains at least a metal precursor, an oxidizing agent, and an inert carrier glass.

As mentioned above, in the preferred embodiment, the top coating 20 contains fluorine doped tin-oxide. Suitable constituents of the second gaseous mixture to form the preferred top coating 20 include DMT, oxygen, water, hydrofluoric acid, and helium. Trifluoroacetic acid is a possible substitute for the hydrofluoric acid.

After the application of the top coating 20, the glass may optionally be subsequently processed. However, subsequent processing is not required to practice the invention. After any and all subsequent processing, the coated glass substrate 10 is cooled to ambient temperature (Box 50).

The coated glass substrate 10 manufactured in accordance with the above described method has exhibited a haze of less than 2%, preferably less than 1%. The above method may also be used to produce the coated glass substrate 10 more economically due to the use of less expensive halogen containing precursor materials than nonhalogen containing substitutes.

In accordance with the provisions of the patent statutes, the present invention has been described in what is considered to represent its preferred embodiment, however it should be noted that the invention can be practiced otherwise than as specifically illustrated and described without departing from its spirit or scope.

What is claimed is:

1. A method of producing a coated glass substrate having a low haze comprising:
    a) providing a soda-lime glass substrate having at least one surface upon which a coating may be deposited;
    b) heating the surface of the glass substrate to more than 1260° F. to volatilize salts that may form during application of a first coating;
    c) directing a first gaseous precursor mixture including at least a halogen containing precursor and a metal precursor toward and along the surface to be coated and reacting the mixture at or near the surface while the surface is at a temperature of more than 1260° F. to form the first coating;
    d) cooling the surface of the coated glass substrate to less than 1200° F.; and
    e) directing a second gaseous precursor mixture including at least a metal precursor toward and along the coated surface of the glass substrate and reacting the mixture at or near the coated surface to form a metal containing coating.

2. A method as defined in claim 1, wherein the temperature of the surface of the glass substrate does not exceed about 1370° F. during said step c).

3. A method as defined in claim 1, wherein the temperature of the surface of the glass substrate is not lower than 1090° F. during said step e).

4. A method as defined in claim 1, wherein the halogen is chlorine.

5. A method as defined in claim 1, wherein the metal in the metal containing precursor of the first gaseous precursor mixture is tin.

6. A method as defined in claim 1, wherein the metal applied during said step e) is in the form of a metal oxide.

7. A method of producing a coated glass substrate having a low haze comprising:
    a) providing a soda-lime glass substrate having at least one surface upon which a coating may be deposited;
    b) heating the surface of the glass substrate to more than 1260° F. to volatilize salts that may form during application of a first coating;
    c) directing a first gaseous precursor mixture including at least a halogen containing precursor and a metal precursor toward and along the surface to be coated and reacting the mixture at or near the surface while the surface is at a temperature of more than 1260° F. to form the first coating;
    d) directing an intermediate gaseous precursor mixture to including a silane containing precursor material, oxygen, and an inert carrier gas toward and along the surface to be coated and reacting the mixture at or near the surface to form a silica coating on the first coating;
    e) cooling the surface of the coated glass substrate to less than 1200° F.; and
    f) directing a second gaseous precursor mixture including at least a metal precursor toward and along the coated surface of the glass substrate and reacting the mixture at or near the coated surface to form a metal containing coating;
    whereby the coated glass substrate exhibits a haze of less than 2%.

8. A method as defined in claim 7, wherein the temperature of the surface of the glass substrate does not exceed about 1370° F. during said step c).

9. A method as defined in claim 7, wherein the temperature of the surface of the glass substrate is not lower than 1090° F. during said step f).

10. A method as defined in claim 7, wherein the halogen is chlorine.

11. A method as defined in claim 7, wherein the metal in the metal containing precursor of the first gaseous precursor mixture is tin.

12. A method as defined in claim 7, wherein the metal applied during said step f) is in the form of a metal oxide.

13. A method as defined in claim 7, wherein the temperature of the surface of the glass substrate is maintained below the iridescent temperature of the glass substrate throughout the method.

* * * * *